(12) United States Patent
Meurrens (10) Patent No.: US 9,411,175 B2
(45) Date of Patent: Aug. 9, 2016

(54) EYEGLASS CLEANING APPARATUS (75) Inventor: Peter Meurrens, Burnaby (CA)

(73) Assignee: Parkside Optical Inc., Vancouver, BC ( * ) Notice: Subject to any disclaimer, the term of this patent is extended or adjusted under 35 U.S.C. 154(b) by 487 days.

(21) Appl. No.: 13/817,433

(22) PCT Filed: Aug. 17, 2010

(86) PCT No.: PCT/CA2010/001279
§ 371 (c)(1),
(2), (4) Date: Apr. 5, 2013

(87) PCT Pub. No.: WO2012/021962
PCT Pub. Date: Feb. 23, 2012

(65) Prior Publication Data
US 2013/0291892 A1 Nov. 7, 2013

(51) Int. Cl.
G02C 13/00 (2006.01)
A46B 7/02 (2006.01)
B08B 1/00 (2006.01)

(52) U.S. Cl.
CPC ............ *G02C 13/006* (2013.01); *A46B 7/023* (2013.01); *A46B 2200/3073* (2013.01); *B08B 1/001* (2013.01); *B08B 1/006* (2013.01)

(58) Field of Classification Search
CPC ...... G02C 13/006; A45C 11/043; A47L 1/08; A47L 1/095; A47L 1/13; A47L 1/15; A47L 13/17; A47L 13/26; A47L 25/00; A46B 7/023; A46B 15/00; A46B 15/0055; A46B 2200/30; A46B 2200/3073; B08B 1/00; B08B 1/001; B08B 1/006; B08B 2240/00
USPC ............ 15/104.94, 114, 214, 220.3; 206/5, 6; 401/9, 10, 126–130
See application file for complete search history.

(56) References Cited

U.S. PATENT DOCUMENTS 2,775,778 A * 1/1957 Mattson ............... G02C 13/006
15/214
3,249,550 A * 5/1966 Metters .......................... 510/163
(Continued)

FOREIGN PATENT DOCUMENTS

CA 2120127 A1 4/1993
CA 2611821 A1 8/2008
(Continued)

*Primary Examiner* — Mark Spisich
(74) *Attorney, Agent, or Firm* — Oyen Wiggs Green & Mutala LLP (57) ABSTRACT An eyeglass cleaning apparatus employing a non-liquid cleaning composition is described. In one embodiment, the apparatus comprises a hand-held cleaning instrument and a housing for receiving the cleaning instrument. The cleaning instrument includes at least one cleaning surface containing the cleaning composition and the housing includes at least one replenishment pad which may also contain the cleaning composition. The instrument is movable between a stowed position at least partially inserted within the housing and a deployed position at least partially withdrawn from the housing. The cleaning surface contacts the replenishment surface when the cleaning instrument is moved between the deployed and stowed positions to reorient the cleaning composition particles on the surface of the cleaning surface and hence replenish the cleaning capacity of the cleaning instrument. In one embodiment the cleaning instrument may comprise a pair of cleaning surfaces each mounted on a respective arm. The arms may be operatively coupled together, for example in a tweezer-like fashion at one end thereof. In this embodiment the cleaning instrument may be manually used to enable simultaneous cleaning of inner and outer surfaces of an eyeglass lens. In one particular embodiment of the invention the cleaning composition is a combination of carbon black and a hemihydrate of calcium sulfate.

40 Claims, 11 Drawing Sheets

(56) References Cited

U.S. PATENT DOCUMENTS

| | | | |
|---|---|---|---|
| 4,480,352 A | 11/1984 | Eggett | |
| 4,842,132 A | 6/1989 | Wells | |
| 5,222,268 A | 6/1993 | Snodgrass | |
| 5,457,842 A * | 10/1995 | Chang | 15/214 |
| 5,993,560 A * | 11/1999 | Wasak et al. | 134/6 |
| 2005/0226678 A1 * | 10/2005 | Meert | G02C 13/006 401/187 |
| 2007/0039115 A1 | 2/2007 | Stefel | |

FOREIGN PATENT DOCUMENTS

| | | | |
|---|---|---|---|
| DE | 4027213 | * | 2/1992 |
| DE | 195 03 586 C1 | | 2/1996 |
| DE | 102008058733 | * | 5/2010 |
| JP | 2007-212484 | * | 8/2007 |
| WO | 93/07523 A1 | | 4/1993 |

* cited by examiner

EYEGLASS CLEANING APPARATUS

FIELD OF INVENTION

The present invention relates to apparatus for cleaning eyeglass lenses, including sunglass lenses. The present invention also relates to methods of cleaning eyeglass lenses and eyeglass lens cleaning compositions.

BACKGROUND OF THE INVENTION

Eyeglass lenses get dirty easily from a variety of sources. Dirty eyeglasses are not only unsightly, but also impair the vision of the person wearing them. Two categories of contaminants are commonly found on lens surfaces, namely (1) dust, grit and other potentially abrasive materials; and (2) fingerprints and other oils.

Various articles and methods have been developed for cleaning eyeglass lenses. For example, wipes, cloths and tissues are commonly used as eyeglass cleaners. However, such cleaning items do not always allow for effective removal of dirt and other abrasive materials. Instead, small abrasive particles can be rubbed on the lens surfaces, potentially scratching the lens or damaging surface coatings. Further, wipes, cloths and tissues are not effective in cleaning fingerprints and other oils since their fibers are not able to absorb surface oils quickly. As a result, such cleaning items may actually spread a thin layer of oily residue over the lens surface. Another problem with wipes, cloths and tissues is that they tend to become dirty wherever they are touched by a user and hence their cleaning capacity is very quickly compromised.

Cleaning substances, such as soap, detergent, gel, alcohol, or the like, may also be used to clean eyeglass lenses. However, it is often inconvenient to carry such cleaning substances and the cleaned eyeglasses may still need to be rinsed with water and then wiped dry with tissue paper or cloth. Moreover, liquid cleaning solutions are prone to leaking into purses, briefcases or other carrying devices and may not be permitted to be carried on to aircraft.

In the past, eyeglasses were often made of tempered glass. Today, it is common for eyeglasses to be made of plastic lenses with special anti-reflective and anti-scratch coatings for glare reduction, ultraviolet (UV) light protection and scratch resistance. Most sunglasses are also made of plastic materials. These plastic lenses with surface coatings are more difficult to clean, and special care must be taken to avoid abrading the coatings or scratching the plastic lenses.

The inventor has determined that it would be beneficial to provide an apparatus for cleaning eyeglass lenses that is capable of effectively and quickly removing both dust and other abrasive particles and fingerprints and other oils without abrading or scratching the lenses. It is also desirable to provide an eyeglass cleaning apparatus which employs a non-liquid cleaning composition, is easy to carry and is aesthetically pleasing in appearance. There is also a need for an eyeglass cleaning apparatus which may be replenished and reused multiple times without any significant decline in cleaning performance.

BRIEF DESCRIPTION OF THE DRAWINGS

In drawings which illustrate non-limiting embodiments of the invention:

FIGS. 19A-19D are views of a further alternative embodiment of the invention having a cylindrical replenishment pad disposed within the housing.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1A:
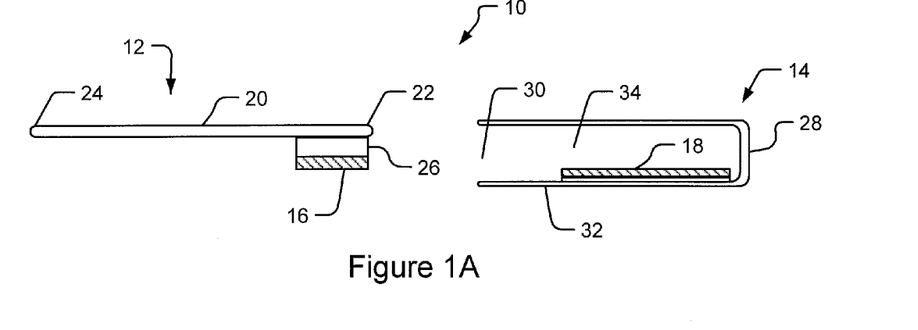
FIG. 1A is schematic view of one embodiment of an eyeglass cleaning apparatus comprising a cleaning instrument having a single cleaning pad and showing the instrument in a deployed position withdrawn from a housing.
Figure 1B:
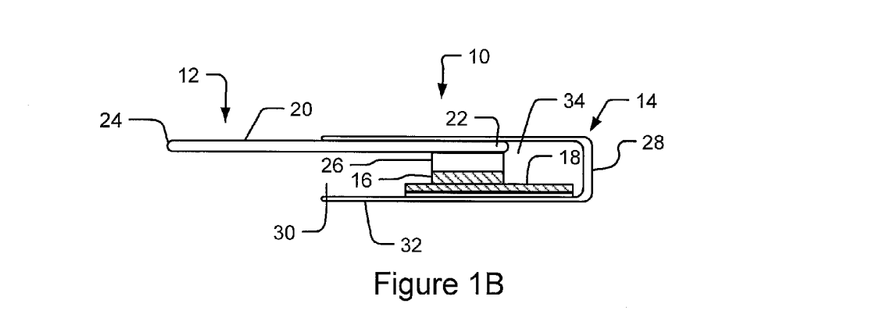
FIG. 1B is a schematic view of the embodiment of FIG. 1A showing the cleaning instrument in a partially stowed position inserted within the housing.

FIGS. 1A and 1B show an eyeglass cleaning apparatus 10 according to one embodiment of the invention. As used in this patent application "eyeglasses" includes sunglasses and any other eyewear comprising optical lenses. Apparatus 10 comprises a hand-held cleaning instrument 12 and a housing 14 for receiving instrument 12.

Cleaning instrument 12 includes a cleaning pad 16 carrying a non-liquid cleaning composition. Pad 16 has an outer cleaning surface for contacting an eyeglass lens. The cleaning composition is formulated to clean eyeglasses without scratching plastic lenses or abrading surface coatings. In one embodiment of the invention the cleaning composition comprises powdered carbon black. In some embodiments, the cleaning composition comprises carbon black and an additive. For example, the cleaning composition may comprises carbon black and a binding agent, such as hydrated calcium sulfate ($CaSO_4\ 2H_2O$). In some particular embodiments, the cleaning composition may comprise approximately 85-90% carbon black mixed with approximately 10-15% of hemihydrate of calcium sulfate. In a particular embodiment of the invention the cleaning composition may comprise 88% carbon black and 12% hemihydrate of calcium sulfate. The inventor has empirically determined that a cleaning composition comprising this formulation is particularly effective in cleaning fingerprints and the like from plastic eyeglass lens surfaces without scratching or abrading the lens or surface coatings.

Cleaning pad 16 may be formed from a microfiber cloth having a plurality of tiny fiber grooves and interstices. Pad 16 may also be formed from natural or synthetic chamois leather. The cleaning composition may be impregnated in the cloth or other material in a fine powder form. In one example, the cleaning composition may be made by blending the carbon black and hydrated calcium sulfate constituents in a powdered granular form. The composition may then be loaded on to cleaning pad 16 by contacting pad 16 with the blended powder.

Housing 14 includes a cleaner replenishment pad 18 that may also contain a supply of the carbon black cleaning composition. For example, pad 18 may consist of a foam pad loaded with the cleaning composition. Pad 18 may also be formed from natural or synthetic chamois leather or microfiber cloth loaded with the cleaning composition. Replenishment pad 18 has an outer surface for contacting cleaning surface 16. As described further below, when instrument 12 is moved between a stowed position at least partially extending within housing 14 and a deployed position at least partially removed from housing 14, cleaning pad 16 physically engages replenishment pad 18 (FIG. 1B). This causes a reorienting of the cleaning composition particles impregnated in cleaning pad 16, resulting in a change in the particles disposed on the outer cleaning surface thereof. For example, the reorienting may consist of a repositioning and/or realignment of some of the particles. This change in the cleaning composition particles presents new particle surfaces capable of absorbing oils from the eyeglass lens and hence a replenishment of the cleaning capacity of cleaning instrument 12 after each use.

Since replenishment pad 18 is also loaded with particles of the cleaning composition in powder form in this embodiment of the invention, the physical contact between cleaning pad 16 and replenishment pad 18 results in interaction between surface particles on pads 16,18. Since both cleaning pad 16 and replenishment pad 18 are fully loaded or nearly fully loaded with cleaning composition, the physical interaction between pads 16, 18 does not result in a loss of cleaning composition from pad 16 or a significant net transfer of cleaning composition from one pad 16, 18 to the other.

In alternative embodiments of the invention, replenishment pad may comprise other materials which cause a reorienting of the cleaner composition particles on pad 16 without resulting in a significant net loss of particles from pad 16 during each physical engagement.

In the embodiment of FIGS. 1A and 1B, cleaning instrument 12 consists of an elongated arm 20 having a first end 22 and a second end 24. A cleaning tip 26 projects laterally from first end 22 of arm 20 for supporting cleaning pad 16. Arm 20 may be easily and ergonomically held by a user to manipulate cleaning pad 16.

In the illustrated embodiment, housing 14 includes a closed end 28 and an open end 30. Cleaner replenishment pad 18 is disposed part-way between ends 28, 30. For example, pad 18 may be supported by a sidewall 32 of housing 14 (FIGS. 1A and 1B).

Hand-held cleaning instrument 12 is insertable into housing 14 through open end 28 and is movable between the stowed and deployed positions. In this embodiment, instrument 12 is sized so that it is snugly received within an inner cavity 34 of housing. This ensures that cleaning pad 16 will frictionally contact replenishment pad 18 as shown in FIG. 1B when cleaning instrument 12 and housing 14 are coupled together.

Figure 2:
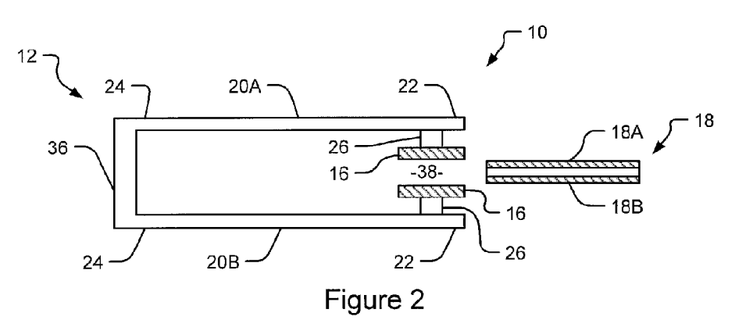
FIG. 2 is a schematic view of another embodiment of an eyeglass cleaning apparatus comprising a cleaning instrument having an opposed pair of cleaning pads and showing the instrument in a deployed position.

FIG. 2 shows an eyeglass cleaning apparatus 10 according to another embodiment of the invention. In this embodiment hand-held cleaning instrument 12 includes a first arm 20A and a second arm 20B which are operatively coupled together. In the illustrated embodiment arms 20A, 20B are joined together at respective second ends 24 thereof by an end member 36. Each arm 20A, 20B includes a cleaning tip 26 projecting laterally from first end 22 thereof for supporting a cleaning pad 16 comprising the non-liquid cleaning composition. In this embodiment opposed cleaning pads 16 are separated by a small gap 38. In use, instrument 12 can be manipulated so that an eyeglass lens is disposed within gap 38. Arms 12A, 12B may then be pressed gently together until cleaning pads 16 contact respective inner and outer surfaces of the eyeglass lens. Thus the apparatus 10 of FIG. 2 can be used to clean both sides of an eyeglass lens simultaneously by compressing arms 12A, 12B toward one another and reciprocating cleaning pads 16 over respective surfaces of the lens to be cleaned.

FIG. 2 also illustrates a replenishment pad 18 having a first portion 18A and a second portion 18B. In this embodiment, replenishment pad 18 is configured to contact both cleaning pads 16 simultaneously when cleaning pads 16 and replenishment pad 18 come into frictional contact. Thus in this embodiment pad 18 is approximately the same thickness as the gap 38 between cleaning pads 16.

Figure 3A:
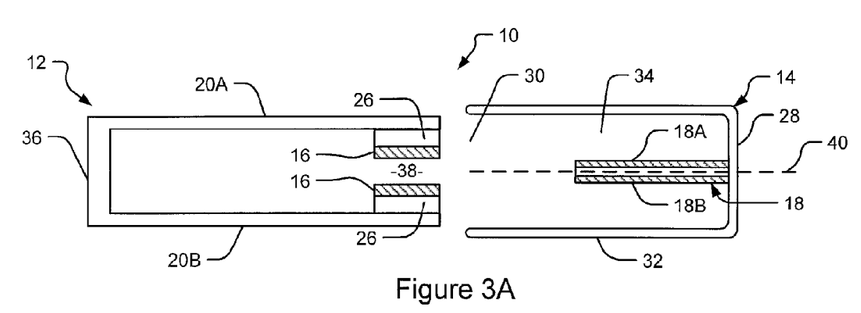
FIG. 3A is a schematic view of the cleaning instrument of FIG. 2 withdrawn from a housing.
Figure 3B:
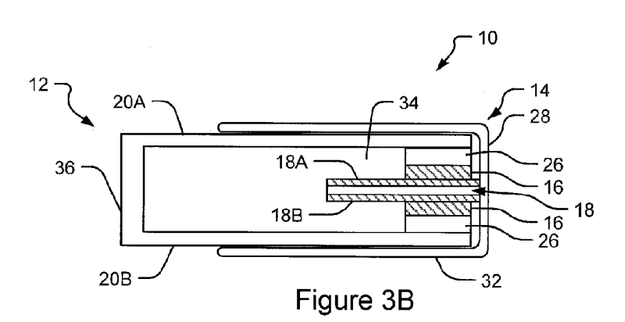
FIG. 3B is a schematic view of the cleaning instrument of FIG. 2 stowed within the housing with the cleaning pads in contact with a centrally disposed replenishment pad.

FIGS. 3A and 3B illustrate a further embodiment of the invention similar to FIG. 2. In this embodiment replenishment pad 18 is supported within a central portion of housing 14. For example, replenishment pad 18 may be disposed so that a longitudinal axis of pad 18 is aligned with a central axis 40 of housing 14. This could be achieved, for example, by securing an end portion of replenishment pad 18 to closed end 28 of housing 14. As shown best in FIG. 3B, when instrument 12 is snugly received within the interior cavity 34 of housing 12 in the stowed position, cleaning pads 16 come into contact with respective portions 18A and 18B of replenishment pad 18. As in the embodiment of FIGS. 1A and 1B, this results in a reorienting of the cleaning composition particles impregnated in cleaning pad 16 and hence a replenishment of the cleaning capacity of cleaning instrument 12 when instrument 12 is moved between the stowed and deployed positions.

When instrument 12 is in the stowed position (FIG. 3B), the cleaning pads 16 are sealed within housing 14. This prevents contamination of cleaning composition on cleaning pads 16 when apparatus 10 is not in use and prevents the cleaning composition from getting on other articles.

Figure 4:
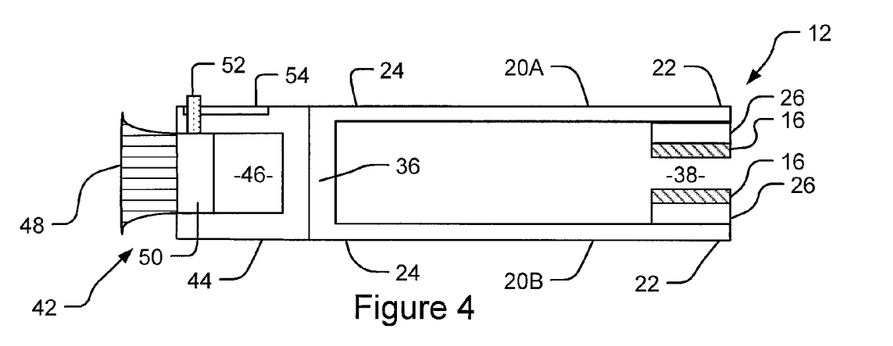
FIG. 4 is a schematic view of a cleaning instrument configured in accordance with one embodiment of the invention showing a brush assembly in an extended position.
Figure 5:
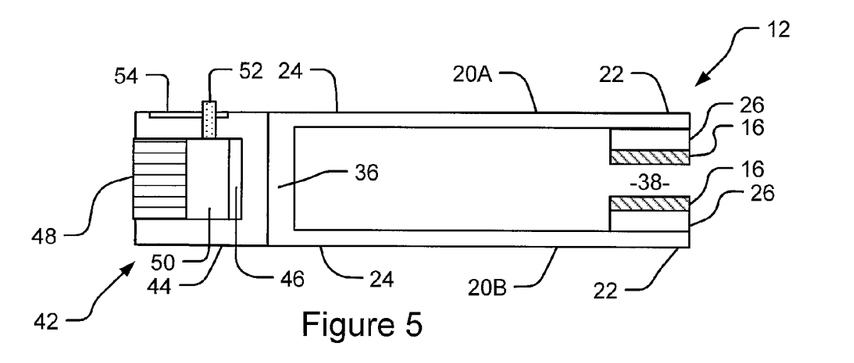
FIG. 5 is a schematic view of the instrument of FIG. 4 showing the brush assembly in a retracted position.

FIGS. 4-5 illustrate a further alternative embodiment of the hand-held cleaning instrument 12 of the invention. This embodiment is similar to the embodiment of FIGS. 2 and 3, but further includes a brush assembly 42 coupled to end member 36. Brush assembly 42 includes an outer shell 44 defining an inner cavity 46. An end surface of shell 44 is connected to end member 36. Assembly 40 further includes a brush 48 that is movable between an extended position (FIG. 4) and a retracted position stowed within cavity 46 (FIG. 5). In the illustrated embodiment, the bristles of brush 48 are embedded in a movable member 50 that is slidable within cavity 46. For example, movable member 50 may be connected to a finger grip 52 which is slidable along a slot 54 extending longitudinally parallel to the path of movement of member 50. In use, brush 48 may be extended to remove dust, grit or other potentially abrasive particles from an eyeglass lens before cleaning the lens using cleaning pads 16.

Figure 6:
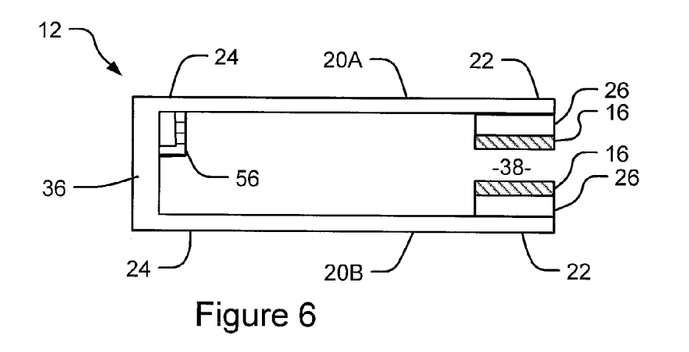
FIG. 6 is a schematic view of a further embodiment of a cleaning instrument configured in accordance with the invention comprising a biasing element for biasing one of the cleaning instrument arms outwardly.

FIG. 6 shows a cleaning instrument 12 according to another embodiment of the invention. In the FIG. 6 embodiment, the cleaning instrument 12 comprises a biasing element 56 for biasing at least one of the arms 20A and 20B outwardly. The biasing element 56 may be attached to the second end 24 of the arms 20A, 20B and may comprise, for example, a helical spring, a leaf spring, or a resilient material. Biasing element 56 ensures that cleaning instrument 12 will be snugly received within housing 14 when instrument 12 is moved to the stowed position within cavity 34 (FIG. 3B). That is, at least one of aims 20A, 20B will be biased outwardly to engage an inner surface of sidewall 34 of housing 14 in the stowed position. Biasing element 56 also increases the gap 38 between opposed cleaning pads 16 so that cleaning instrument 12 can accommodate eyeglasses (including sunglasses) with relatively thick frames without increasing the overall size of apparatus 10.

Figure 7:
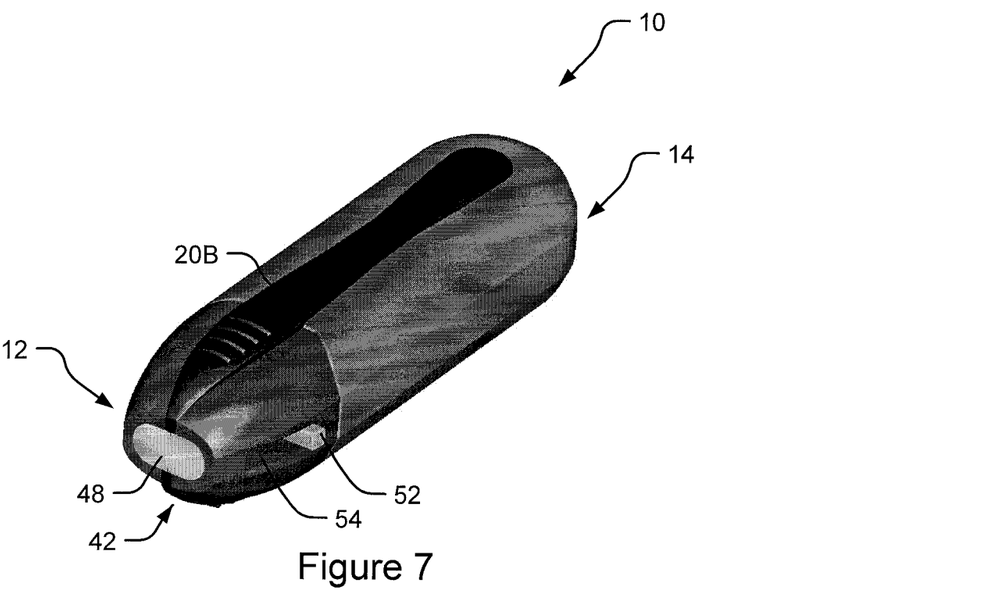
FIG. 7 is a front perspective view of an apparatus configured in accordance with one embodiment of the invention showing the cleaning instrument in a stowed position within a housing and showing the brush assembly in a retracted position.
Figure 8:
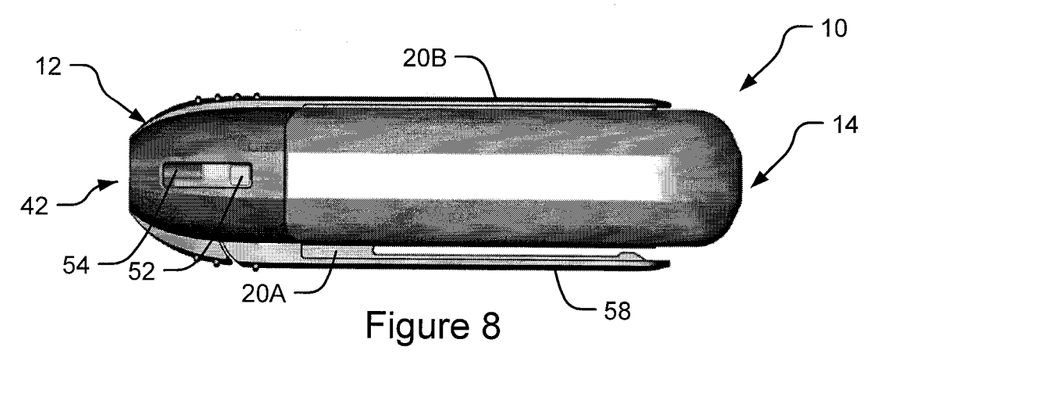
FIG. 8 is a side view of the apparatus of FIG. 7.
Figure 9:
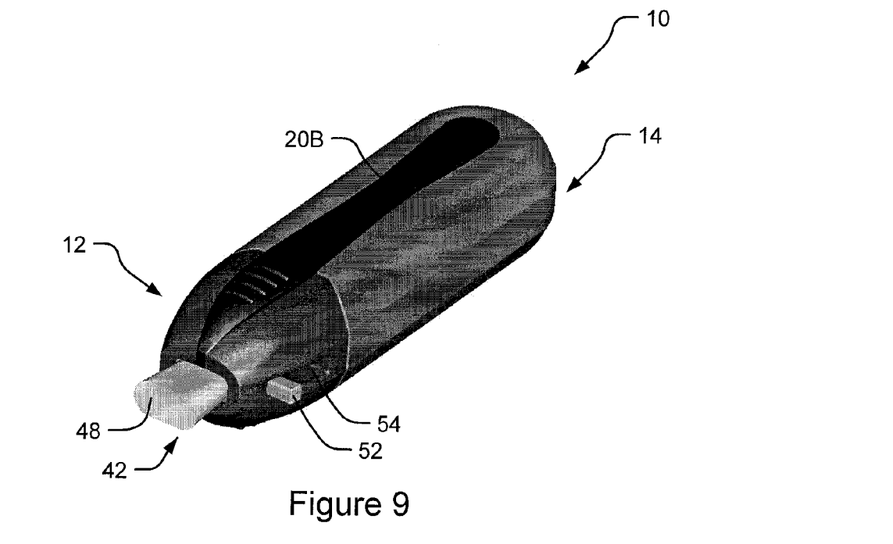
FIG. 9 is a front perspective view of the embodiment of FIG. 7 showing the brush assembly in an extended position.
Figure 10:
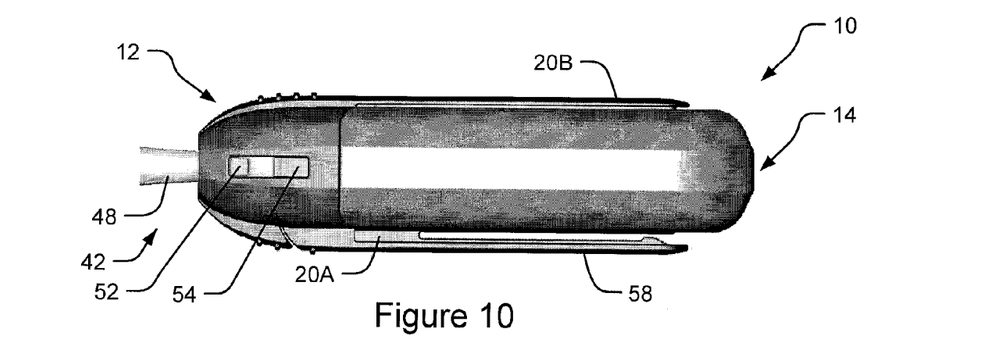
FIG. 10 is a side view of the apparatus of FIG. 9.
Figure 11:
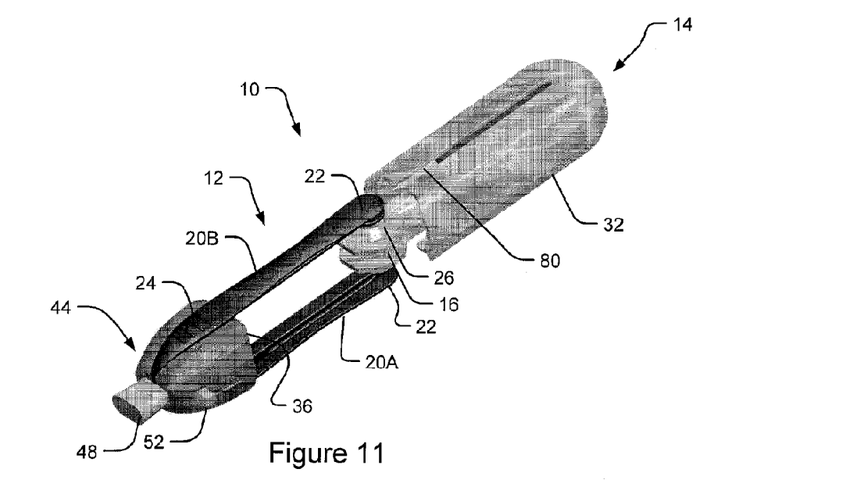
FIG. 11 is a front perspective view of the apparatus of FIG. 9 showing the cleaning instrument in a deployed position withdrawn from the housing.
Figure 12:
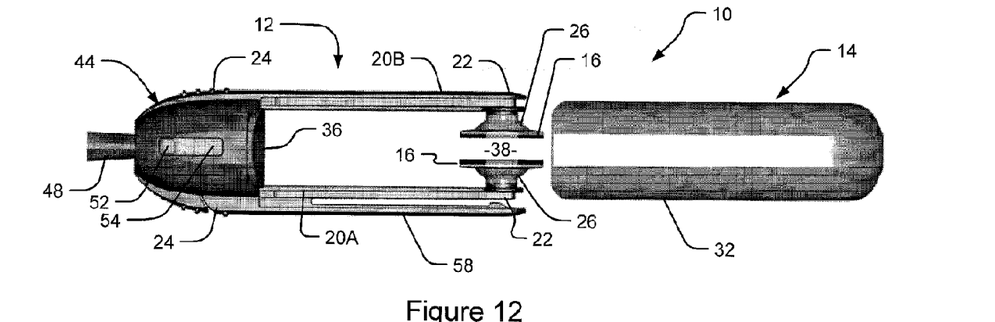
FIG. 12 is a side view of the apparatus of FIG. 11.
Figure 13:
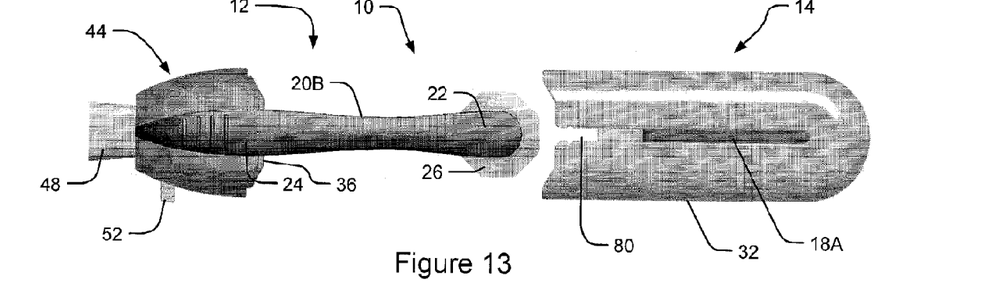
FIG. 13 is a top view of the apparatus of FIG. 11.
Figure 14:
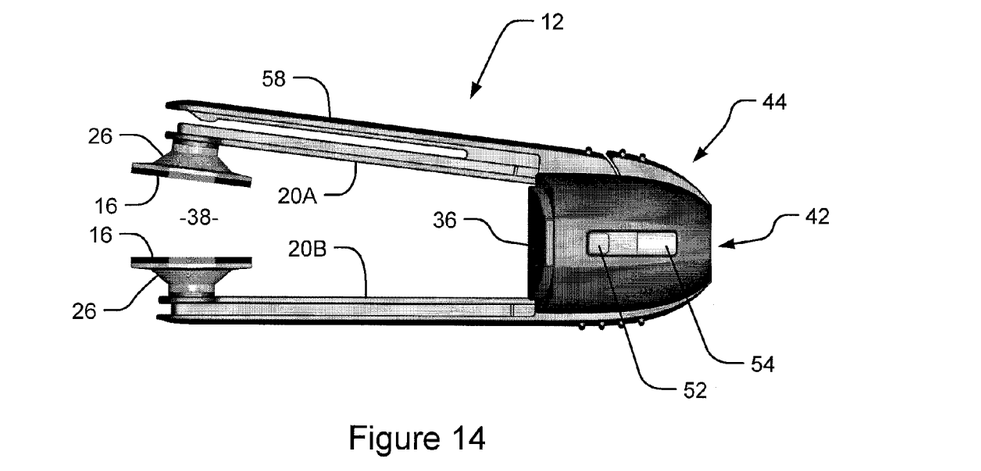
FIG. 14 is an enlarged side view of the cleaning instrument of the apparatus of FIG. 11 with one arm biased outwardly.
Figure 15:
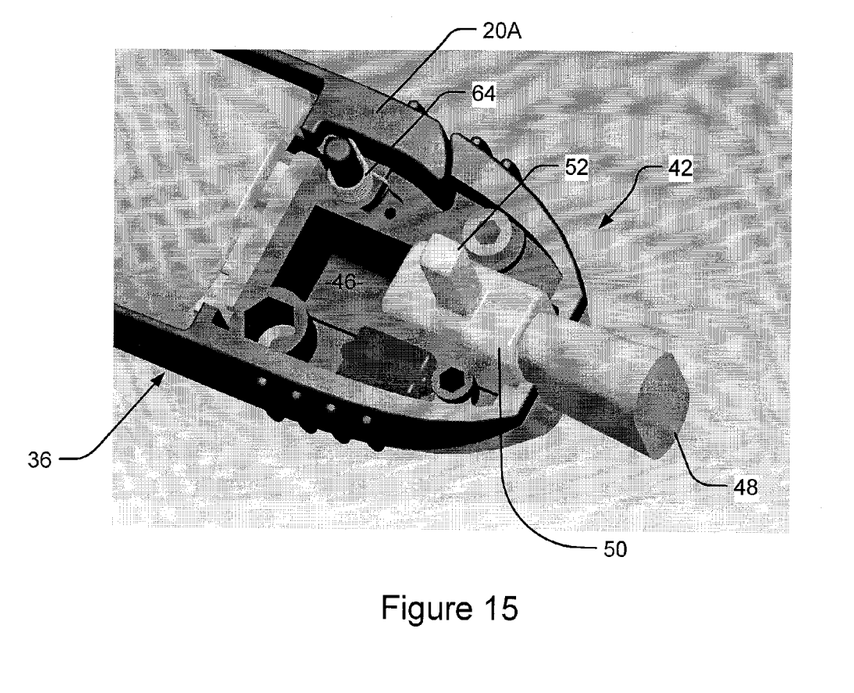
FIG. 15 is an enlarged view of an end member and brush assembly of the embodiment of FIGS. 7-15.
Figure 16:
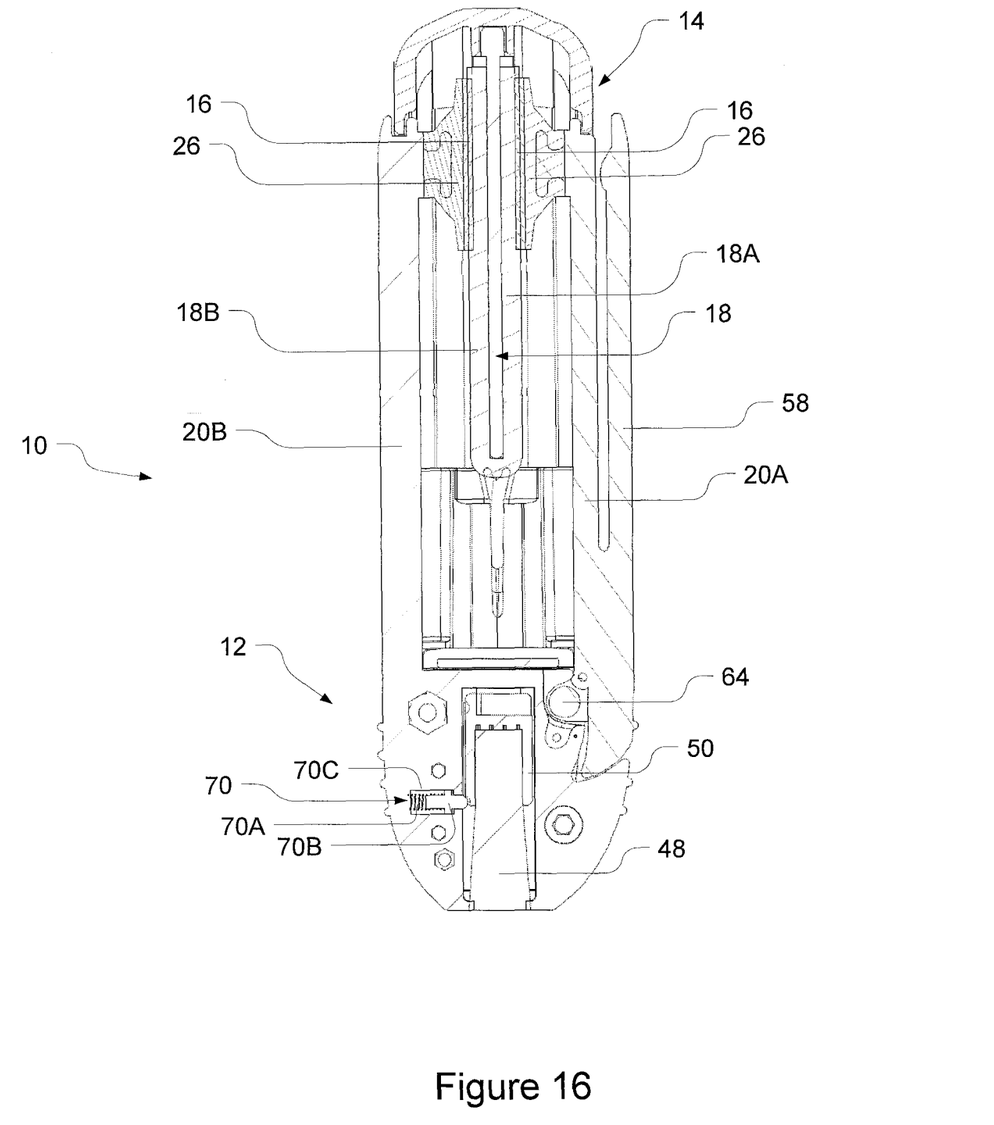
FIG. 16 is a longitudinal sectional view of the apparatus of FIG. 7.
Figure 17:
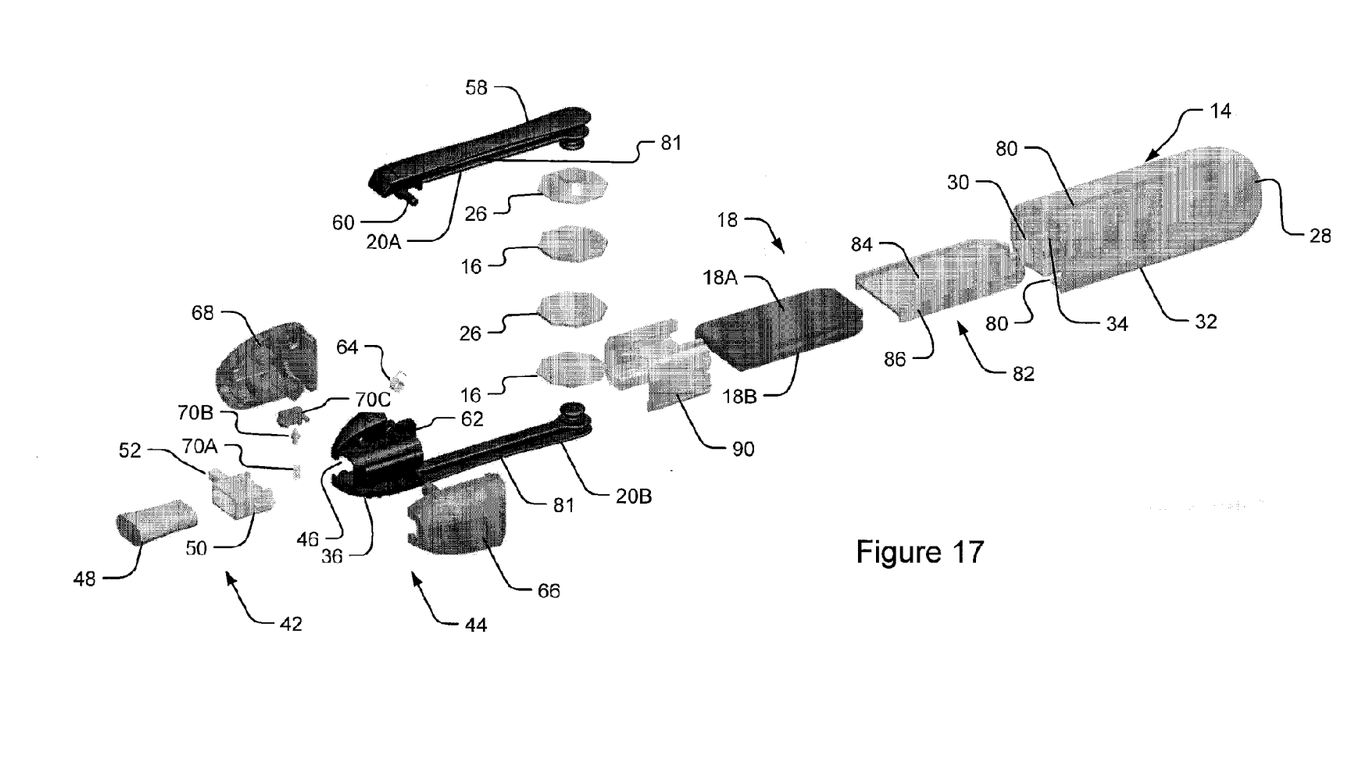
FIG. 17 is an exploded view of the component parts of the apparatus of FIGS. 7-16.

FIGS. 7-17 illustrate a further embodiment of the invention that incorporates some of the features of the embodiments described above. FIGS. 7 and 8 show apparatus 10 with cleaning instrument 12 in the stowed position within housing 14 and with brush 48 retracted. FIGS. 9 and 10 show apparatus 10 with cleaning instrument 12 in the stowed position within housing 14 and with brush 48 extended. FIGS. 11-13 show apparatus 10 with cleaning instrument 12 in the deployed position removed from housing 14 and showing brush 48 extended. FIGS. 14-16 illustrate other features of this embodiment of apparatus 10 and FIG. 17 is an exploded view of the various component parts.

As shown best in FIGS. 11-14, in this embodiment of the invention hand-held cleaning instrument 12 comprises a pair of opposed arms 20A, 20B, each supporting a cleaning tip 26 and cleaning pad 16 at respective first ends 22 thereof. Arms 20A and 20B are coupled together at a respective second ends 24 thereof by an assembly comprising end member 36 and shell 44. In the illustrated embodiment, one arm 20A may include a clip 58 for releasably securing apparatus 10 to a shirt pocket, or other pocket-like slots in purses, briefcases or the like when not in use. Arm 20A is coupled to end member 36 by means of a post 60 which fits within an aperture 62 formed in end member 36 (FIG. 17). In this embodiment of the invention biasing element 56 comprises a spring 64 which biases arm 20A outwardly (FIGS. 14-15).

As shown best in FIG. 17, shell 44 includes a first portion 66 and a second portion 68 which may coupled together and to end member 36. As in the embodiment of FIGS. 4-5, shell 44 and end member 36 define an inner cavity 46 for receiving brush assembly 42. Assembly 42 includes brush 48 and movable brush holder 50 that are retractable within cavity 46. A spring mechanism 70 (FIG. 16) may be provided for holding brush 48 and brush holder 50 in a desired position. As shown in FIG. 17, spring mechanism 70 may comprise a spring 70A, a stopper member 70B and a spring cover 70C. Stopper member 70B is in contact with brush holder 50 and spring 70A biases stopper member 70B against brush holder 50. Spring mechanism 70 can hold brush holder 50 in one of a number of desired positions within cavity 46. To move brush holder 50 to a new desired position within cavity 46, a user can slide finger grip 52 within slot 54, which in turn slides brush holder 50 within cavity 46 against the biasing force of spring mechanism 70. Once brush holder 50 has moved into the new desired position, brush holder 50 is held in that position by spring mechanism 70. As will be appreciated by a person skilled in the art, many other alternative mechanisms for adjusting brush assembly 42 or maintaining it in a selected position may be envisioned.

FIGS. 11-14 show cleaning instrument 12 in its fully assembled configuration with brush 48 extended. To adjust brush 48 to its retracted position, a user need only slide finger grip 52 toward first end 22.

With reference to FIG. 17, housing 14 is specifically adapted for receiving cleaning instrument 12 of this embodiment of the invention. In particular, housing 14 includes opposed longitudinally extending slots 80 formed in sidewall 32. Slots 80 receive corresponding ribs 81 formed on arms 20A, 20B when instrument 12 is adjusted between the stowed and deployed positions. Housing 14 also includes a pad support insert 82 that is positioned within the interior of the housing cavity 34 for supporting replenishment pad 18. In this embodiment of the invention replenishment pad 18 includes a first portion 18A for engaging one cleaning pad 16 and a second portion 18B for engaging a second cleaning pad 16 when cleaning instrument 12 is inserted within housing 14. A narrow central slot is defined between first and second portions 18A, 18B for receiving a support surface 84 of insert 82. Insert 82 may also include a peripheral flange 86 for helping to maintain replenishment pad 18 in position. When housing 14 is assembled, insert 82 is positioned in a central portion of housing cavity 34. For example, flange 86 may be received within mating grooves formed in an interior surface of housing sidewall 32.

Housing 14 may also optionally include a support insert 90 that is positionable within housing cavity 34 to provide additional structural support near open end 30.

In use, apparatus 10 is particularly suited for cleaning eyeglass lenses. Apparatus 10 is designed to be used when the lens to be cleaned is in a dry condition and hence any water or other liquid droplets should first be removed. Brush 48 may be adjusted to its extended position while cleaning instrument 12 remains in a stowed position within housing 14 (FIGS. 9-10) or when instrument 12 is withdrawn from housing 14 in a deployed position (FIGS. 11-13). As indicated above, brush 48 is used to remove dust, grit or any other potentially abrasive loose particles present on the lens to be cleaned. Brush 48 is then adjusted to its retracted position as described above.

In the deployed position of FIGS. 11-14, instrument 12 resembles hand-held tweezers or pinchers. Instrument 12 may be manually adjusted so that an eyeglass lens is positioned within gap 38 defined between opposed cleaning pads 16 (FIG. 12). Since one arm 20A may be biased outwardly by spring 64, instrument 12 can accommodate eyeglasses having relatively large frames. Arms 20A and 20B may then be gently pressed together against the bias of spring 64 until respective cleaning pads 16 contact each side of the lens. The non-liquid cleaning composition carried on pads 16 may then be rubbed on the lens surfaces to remove oils, fingerprints and other dirty residues. Such oils are quickly absorbed by the cleaning composition particles present on pads 16.

Once the eyeglasses are sufficiently cleaned, instrument 12 may be reinserted into housing 14 and slid to the stowed position. As explained above, as instrument 12 is moved between the deployed and stowed positions, cleaning pads 16 frictionally contact respective replenishment pad portions 18A and 18B (FIG. 16) disposed within housing 14. This causes a reorienting of the cleaning composition particles impregnated in cleaning pad 16 and hence a replenishment of the cleaning capacity of cleaning instrument 12. In one embodiment of the invention, cleaning instrument 12 may be replenished and reused a large number of times before exhausting the cleaning capacity of the cleaning composition. Optionally, cleaning pads 16 may also be periodically removed from cleaning tips 26 and replacement pads 16 impregnated with a fresh supply of the cleaning composition may be installed. In another optional embodiment of the invention apparatus 10 is disposable after its cleaning capacity is exhausted.

Figure 18:
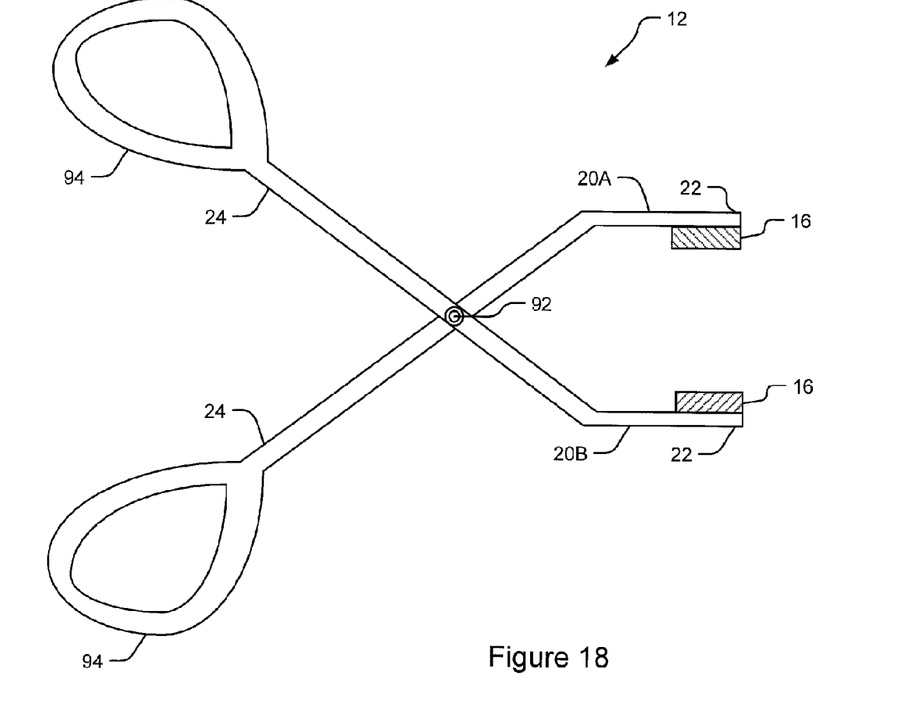
FIG. 18 is a side view of a cleaning instrument configured in accordance with an alternative embodiment of the invention.

FIG. 18 illustrates a further embodiment of the cleaning instrument 12 of the invention. In this embodiment opposed cleaning pads 16 comprising the non-liquid cleaning composition are disposed on elongated arms 20A and 20B at respective first ends 22 thereof. Arms 20A and 20B are pivotably coupled together at a pivot 92 in a scissor-like fashion. Handles 94 may be provided at respective second ends 24 of arms 20A, 20*b* for manually holding and manipulating instrument 12. In this embodiment of the invention housing 14 (not shown) could be configured to receive only the end portions of arms 20A and 20B carrying cleaning pads 16 in the stowed position.

Many other configurations for elongated arms 20A, 20B could be envisioned. For example, arms 20A, 20B could be curved, inclined or configured in some other non-linear orientation. In some embodiments arms 20A, 20B could be constructed from a resiliently flexible material while in other embodiments arms 20A, 20B could be constructed from a relatively rigid material such as metal or plastic.

Figure 19A:
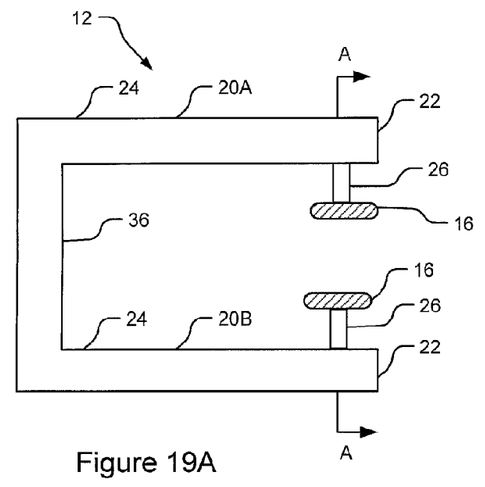
Figure 19B:
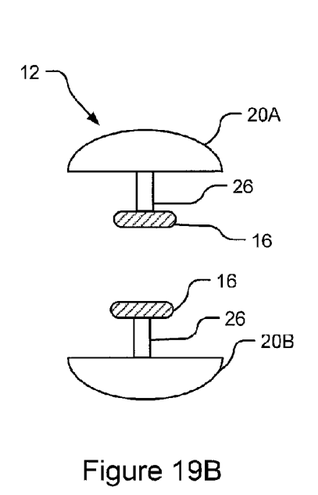
FIG. 19B is a cross-sectional view of the cleaning instrument along line A-A of FIG. 19A.
Figure 19C:
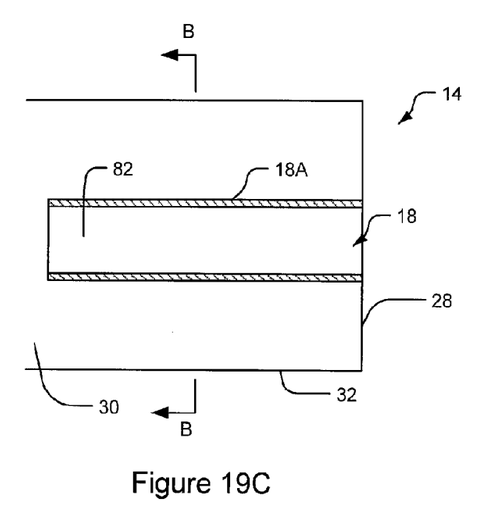
Figure 19D:
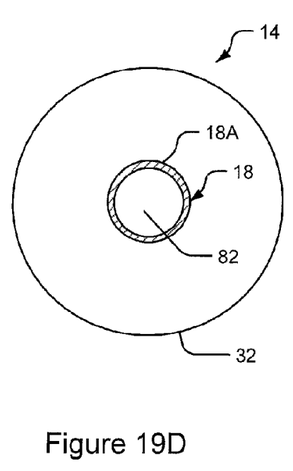
FIG. 19D is a cross-sectional view of the housing along line B-B of FIG. 12C.

FIGS. 19A-19D illustrate another embodiment of the invention. In this embodiment cleaning instrument 12 is configured in a manner similar to the embodiment of FIGS. 2 and 3 and comprises a pair of opposed cleaning pads 16 (FIGS. 19A and 19B). In this embodiment replenishment pad 18 is cylindrical rather than planar (FIGS. 19C and 19D). As in other embodiments, replenishment pad 18 may be positioned within a central portion of a housing cavity 34 and cleaning pads 16 frictionally engage an outer portion 18A of replenishment pad 18 when instrument 12 is moved between the deployed and stowed positions. In this embodiment instrument 12 may be rotatable as well as slidable within housing 14. Optionally, cleaning pads 16 could be resiliently flexible to conform to the shape of replenishment pad 18. In other alternative embodiments, pads 16 could be concave or convex rather than planar.

As will be apparent to someone skilled in the art, many other variations are possible in the configuration of instrument 12 and/or housing 14 without departing from the invention. For example, apparatus 10 could comprise a separate brush for dusting the eyeglass lenses, rather than a brush 48 that is connected to cleaning instrument 12. Also, in some applications cleaning instrument 12 and/or pads 16,18 could be sold separately from housing 14. In other alternative embodiments, cleaning instrument 12 could be releasably connectable to housing 14 by magnetic attraction or some other means other than a friction fit.

As will be apparent to those skilled in the art in the light of the foregoing disclosure, many alterations and modifications are possible in the practice of this invention without departing from the spirit or scope thereof.

What is claimed is:

1. An eyeglass cleaning apparatus comprising:
    (a) a hand-held cleaning instrument having at least one cleaning surface containing a non-liquid cleaning composition suitable for cleaning an eyeglass lens; and
    (b) a housing for receiving said cleaning instrument, wherein said housing comprises a replenishment surface for contacting said cleaning surface,
    wherein said cleaning instrument is movable between a stowed position at least partially inserted within said housing and a deployed position at least partially withdrawn from said housing, wherein said cleaning surface contacts said replenishment surface when said cleaning instrument is moved between said deployed and stowed positions to replenish the cleaning capacity of said cleaning composition on said cleaning surface,
        wherein said at least one cleaning surface comprises a first cleaning surface for cleaning a first side of said eyeglass lens and a second cleaning surface located opposite said first cleaning surface for cleaning a second side of said eyeglass lens.

2. The apparatus as defined in claim 1, wherein said cleaning instrument is slidably movable relative to said housing between said stowed and deployed positions.

3. The apparatus as defined in claim 2, wherein said cleaning surface frictionally engages said replenishment surface as said instrument is moved between said deployed and stowed positions.

4. The apparatus as defined in claim 1, wherein said cleaning instrument comprises a cleaning pad impregnated with said cleaning composition and wherein said cleaning surface comprises an outer portion of said cleaning pad.

5. The apparatus as defined in claim 4, wherein said cleaning instrument comprises at least one arm and said cleaning pad extends from said arm.

6. The apparatus as defined in claim 4, wherein said cleaning pad is formed from a material selected from the group consisting of a microfiber cloth, natural chamois leather and synthetic chamois leather.

7. The apparatus as defined in claim 5, wherein said arm has a first end and a second end and wherein said cleaning surface is disposed on a cleaning tip projecting laterally from said first end.

8. The apparatus as defined in claim 4, wherein said cleaning pad is pre-loaded with said non-liquid cleaning composition.

9. The apparatus as defined in claim 1, wherein said replenishment surface is adapted to reorient particles of said cleaning composition on said cleaning surface when said replenishment surface and said cleaning surface come into frictional contact.

10. The apparatus as defined in claim 1, wherein said housing comprises a replenishment pad comprising said cleaning composition and wherein said replenishment surface comprises an outer portion of said replenishment pad.

11. The apparatus as defined in claim 10, wherein said replenishment pad is formed from a porous material adapted to retain said cleaning composition.

12. The apparatus as defined in claim 11, wherein said replenishment pad is formed from a material selected from the group consisting of foam, microfiber cloth, natural chamois leather and synthetic chamois leather.

13. The apparatus as defined in claim 10, wherein said replenishment pad is planar.

14. The apparatus as defined in claim 10, wherein said replenishment pad is cylindrical.

15. The apparatus as defined in claim 10, comprising a support member disposed within said housing, and wherein said replenishment pad is disposed on an external surface of the support member.

16. The apparatus as defined in claim 15, wherein said replenishment pad comprises a first portion on one side of said support member and a second portion on another side of said support member.

17. The apparatus as defined in claim 1, wherein said cleaning composition comprises carbon black and a binder.

18. The apparatus as defined in claim 1, wherein said cleaning composition comprises a combination of carbon black and a hemihydrate of calcium sulfate.

19. The apparatus as defined in claim 18, wherein said cleaning composition comprises 85-90% carbon black and 10-15% hemihydrate of calcium sulfate.

20. The apparatus as defined in claim 19, wherein said cleaning composition comprises 88% carbon black and 12% hemihydrate of calcium sulfate.

21. The apparatus as defined in claim 1, wherein said housing comprises an open end and a closed end and wherein said cleaning instrument is movable through said open end.

22. The apparatus as defined in claim 21, wherein said replenishment surface is disposed within said housing between said open and closed ends.

23. The apparatus as defined in claim 1, further comprising a brush movable between a retracted position stowed within a recess of said cleaning instrument and an extended position projecting from said instrument.

24. The apparatus as defined in claim 23, wherein said recess is located in an end member of said cleaning instrument.

25. The apparatus as defined in claim 24, wherein said end member comprises a finger grip movable in a slot on a wall of the end member and wherein said finger grip is connected to a movable member embedding a portion of the brush for moving the brush between said extended position and said retracted position.

26. The apparatus as defined in claim 1, wherein said cleaning instrument is releasably connectable to said housing by friction fit.

27. The apparatus as defined in claim 1, wherein said cleaning instrument is releasably connectable to said housing by magnetic attraction.

28. The apparatus as defined in claim 1, wherein said housing comprises longitudinally extending slots formed in sidewall portions thereof and wherein said instrument comprises longitudinally extending ribs slidably receivable within said slots.

29. The apparatus as defined in claim 1, wherein said instrument is completely withdrawn from said housing in said deployed position.

30. An eyeglass cleaning apparatus comprising:
(a) a hand-held cleaning instrument having at least one cleaning surface containing a non-liquid cleaning composition suitable for cleaning an eyeglass lens; and
(b) a housing for receiving said cleaning instrument, wherein said housing comprises a replenishment surface for contacting said cleaning surface,
wherein said cleaning instrument is movable between a stowed position at least partially inserted within said housing and a deployed position at least partially withdrawn from said housing, wherein said cleaning surface contacts said replenishment surface when said cleaning instrument is moved between said deployed and stowed positions to replenish the cleaning capacity of said cleaning composition on said cleaning surface,
wherein said cleaning instrument comprises a cleaning pad impregnated with said cleaning composition and wherein said cleaning surface comprises an outer portion of said cleaning pad,
wherein said cleaning instrument comprises at least one arm and said cleaning pad extends from said arm, and,
wherein said at least one arm comprises a first arm and a second arm each having a first end and a second end, and wherein said at least one cleaning surface comprises a first cleaning surface and a second cleaning surface, wherein said first cleaning surface projects laterally from said first end of said first arm and said second cleaning surface projects laterally from said first end of said second arm, said first and second cleaning surfaces projecting inwardly and facing each other.

31. The apparatus as defined in claim 30, wherein said first and second arms are operatively coupled together.

32. The apparatus as defined in claim 31, wherein said first and second arms are pivotably coupled together.

33. The apparatus as defined in claim 32, wherein said first and second arms are pivotably coupled together at a midportion thereof.

34. The apparatus as defined in claim 33, wherein said instrument comprises handles at respective second ends of said arms for holding said instrument.

35. The apparatus as defined in claim 31, wherein said first and second arms are coupled together at respective second ends thereof.

36. The apparatus as defined in claim 35, wherein said instrument comprises an end member connecting said respective second ends.

37. The apparatus as defined in claim 30, wherein at least one of said arms is biased outwardly in a direction away from the other one of said arms.

38. The apparatus as defined in claim 30, comprising a biasing element for biasing at least one of said arms outwardly in a direction away from the other one of said arms.

39. The apparatus as defined in claim 38, wherein said biasing element comprises a spring.

40. An eyeglass cleaning apparatus comprising:
(a) a hand-held cleaning instrument comprising:
(i) first and second opposed arms operatively connected to each other; and
(ii) a first cleaning pad projecting laterally from said first arm and a second cleaning pad projecting laterally from said second aim, said first and second cleaning pads comprising a non-liquid cleaning composition and projecting inwardly and facing each other;
(b) a housing comprising a replenishment pad disposed within said housing, the replenishment pad having a first portion and a second portion each comprising said non-liquid cleaning composition,
wherein said cleaning instrument is movable between a stowed position at least partially inserted within said housing and a deployed position at least partially withdrawn from said housing, wherein said first cleaning pad contacts said first portion and said second cleaning pad contacts said second portion when said cleaning instrument is moved between said deployed and stowed positions to replenish the cleaning capacity of said cleaning composition on said cleaning instrument.

* * * * *